Nov. 11, 1930. W. H. OLIVER ET AL 1,781,339
HAMBURGER CAKE PRESSING MACHINE
Filed Feb. 24, 1930 2 Sheets-Sheet 2

W. H. Oliver
O. L. Peters
A. A. Struckhoff
Inventors

Patented Nov. 11, 1930

1,781,339

UNITED STATES PATENT OFFICE

WILLIAM H. OLIVER, OF ABILENE, AND OTTO L. PETERS AND ALOYS A. STRUCKHOFF, OF GRINNELL, KANSAS

HAMBURGER-CAKE-PRESSING MACHINE

Application filed February 24, 1930. Serial No. 430,838.

This invention relates to a machine designed for use in forming ground meats such as Hamburger steak or the like into cakes.

The primary object of the invention is to provide a machine of this character which will operate to compress the material and form it into cakes, without the necessity of the operator handling the material.

Another object of the invention is to provide a machine of this type which will be portable, and one which may be readily and easily disassembled to facilitate cleaning.

A still further object of the invention is the provision of means for separating the material formed into a cake, from the material contained in the body portion, and simultaneously ejecting the cake of material from the mold in which it has been formed.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
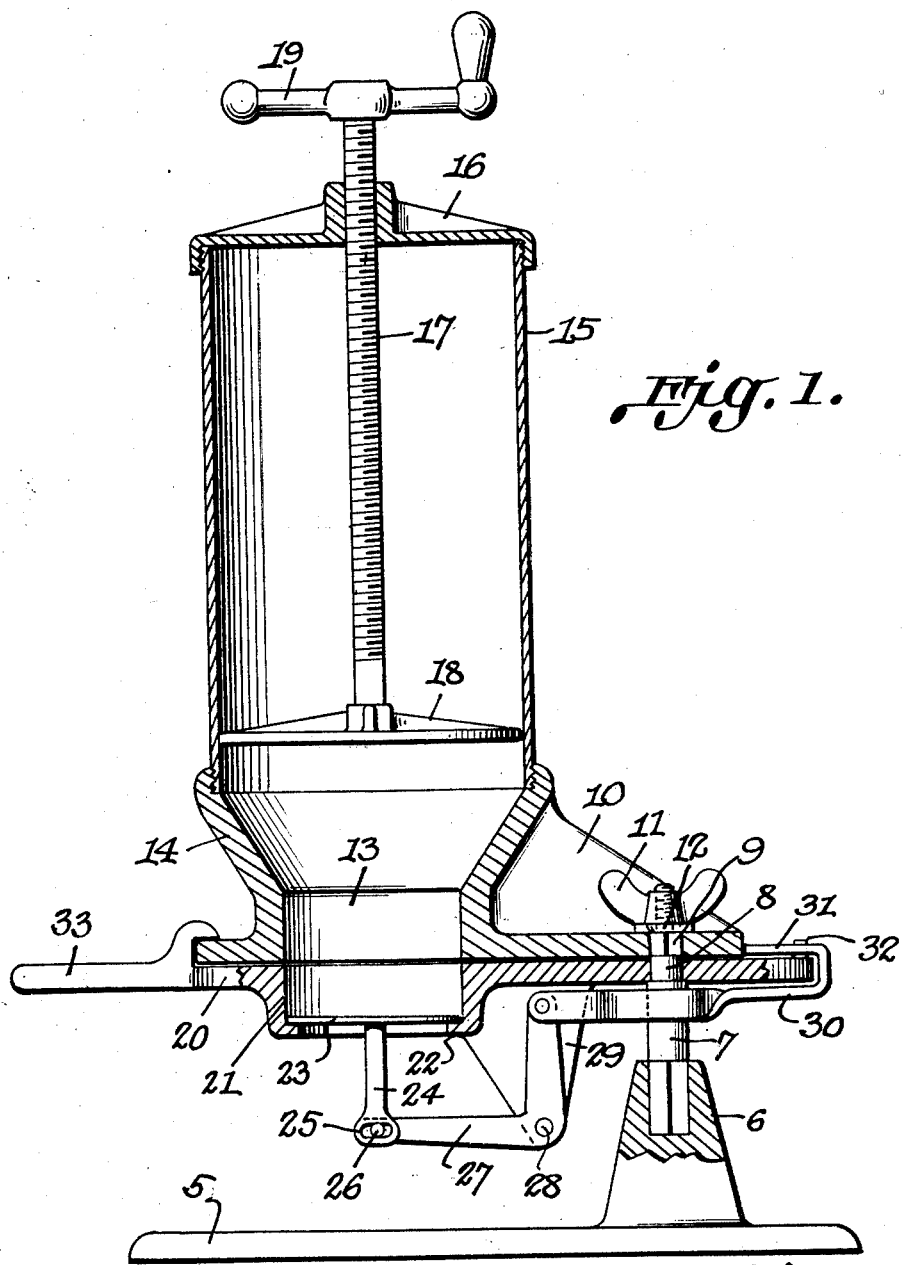
Figure 1 is a vertical sectional view through a device constructed in accordance with the invention.

Referring to the drawings in detail, the reference character 5 designates the base or support of the device, and as shown includes an upstanding enlargement 6, formed with a square opening to receive the lower squared end of the post 7. The upper end of the post 7 is reduced as at 8 and includes a further reduced portion 9 which is square to fit within a square opening of the lower end 10 of the cylindrical container.

A wing nut 11 and washer 12 are mounted on the upper reduced end of the post 7, and act to hold the cylindrical container in its operative position.

The end member 10 is in the form of a casting provided with an opening 13 and a funnel-shaped portion 14 thereabove, which funnel shaped portion directs the material being formed into cakes, to the opening 13.

The cylindrical container which is indicated by the reference character 15, has its lower end threaded to fit within the upper end of the funnel-shaped portion 14, so that the cylindrical container is removably supported.

The upper end of the cylindrical container 15 is closed by means of the threaded cap 16 which is formed with a threaded opening to receive the threaded shank 17 to which the follower 18 is connected, the upper end of the shank 17 being provided with a handle 19 whereby the shank may be rotated to feed the follower through the cylindrical container and exert a pressure on the material held therein.

Supported directly under the cylindrical container is a pivoted member 20 which is formed with an opening to be fitted over the reduced portion 8 of the post 7, the member 20 resting on the shoulder at the base of the reduced portion 8. An opening 21 is formed in the member 20, the opening being provided with an inwardly extended flange 22 acting as a rest for the pusher 23, which is of a diameter to closely fit within the opening 21.

Extending downwardly from the pusher 23, is an arm 24 that is provided with an elongated opening 25 to receive the laterally extended pin 26 of the bell crank lever 27 which is pivotally supported at 28, and mounted on the depending bracket 29 formed integral with the pivoted member 20.

Pivotally connected with the bell crank lever is an arm 30 which is provided with an upwardly and inwardly extended end portion 31 that is provided with an elongated opening to accommodate the pin 32, so that the arm 30 may slide, for purposes to be hereinafter more fully described.

Figure 2:
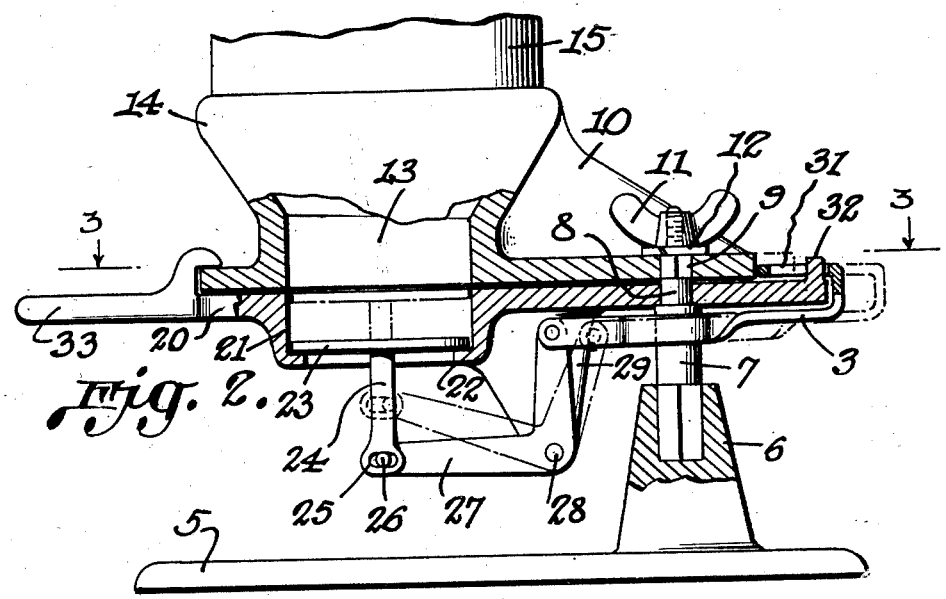
Figure 2 is a sectional view through the lower portion of the device, the vertically movable lifter being shown in its elevated position, in dotted lines.
Figure 3:
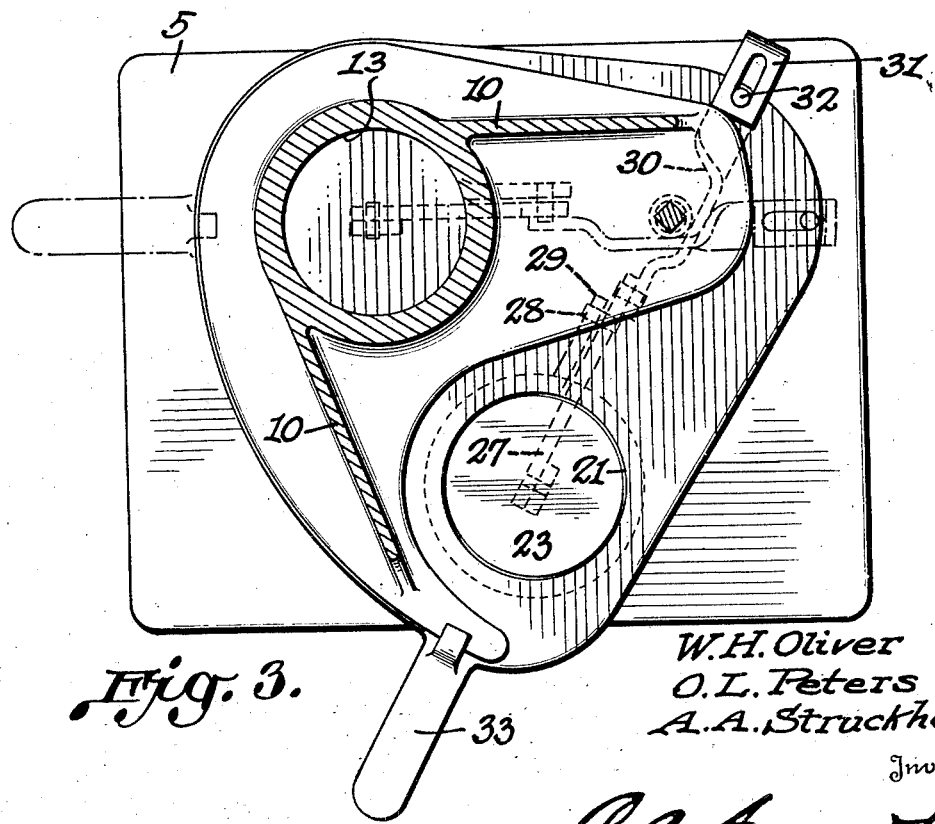
Figure 3 is a sectional view taken on line 3—3 of Figure 2.

As clearly shown by Figure 3 of the drawings, the inwardly extended end 31 of the arm 30, engages one end of the lower end portion 10 of the cylindrical container, the edge being slightly curved so that movement of the member 20 to rotate the member 20, will cause the end of the member 31 to engage one edge of the end member 10 to slide the arm 30, which sliding movement operates the bell crank lever and pusher, moving them to positions as indicated by Figure 2 of the drawings, to push a cake from the opening 21.

A handle 33 extends from the pivoted member 20, and affords means whereby the member 20 may be swung from a position directly under the end member 10, to a position laterally thereof to permit the cake formed by the device, to be removed therefrom.

In the use of the device, the ground meat to be pressed into cakes, is placed in the cylindrical container, whereupon the threaded shank 17 is rotated, causing the follower 18 to exert a pressure on the material, forcing the material into the opening 21 of the pivoted member 20.

The handle 31 is now gripped by the operator and the member 20 is swung laterally to a position as indicated by Figure 3 of the drawing. It is obvious that this movement of the member 20 the arm 30 is operated in a manner as previously stated, and the pusher is elevated, forcing a cake of the material upwardly where it may be removed readily without breaking the cake.

We claim:

1. A machine of the class described comprising a base, a cylindrical container mounted on the base, said cylindrical container including a lower casting having a funnel-shaped contour, a pivoted member disposed under the cylindrical container and having an opening normally lying under the casting to receive material from the cylindrical container, a sliding pusher within the opening, a bell crank lever connected with the sliding pusher, an arm connected with the bell crank lever, one end of the arm engaging the casting to cause the arm to move when the pivoted member is rotated, and said pusher adapted to force material from the opening in the pivoted member.

2. A machine of the class described comprising a base, a container mounted on the base, a receiver mounted to swing in a horizontal plane, disposed under the container, a pusher for pushing material from the receiver, an arm slidably mounted on the base, said arm contacting with the lower end of the container to operate the arm when the receiver is moved from its position under the container, and means for transmitting movement of the arm to the pusher to force material from the receiver.

3. A machine of the class described comprising a base, a cylindrical container having a funnel-shaped base formed with a lateral extension, mounted on the base, a swinging receiver under the base of the container, said lateral extension having a curved edge, said receiver having an opening to receive material from the container, a pusher operating in the opening, an arm slidably mounted on the receiver and contacting with the curved edge of the lateral extension to move the arm laterally when the receiver is swung in a horizontal plane, and means for transmitting movement of the arm to the pusher to force material from the opening.

In testimony that we claim the foregoing as our own, we have hereto affixed our signatures.

WILLIAM H. OLIVER.
OTTO L. PETERS.
ALOYS A. STRUCKHOFF.